(12) United States Patent
Gole

(10) Patent No.: US 8,874,833 B1
(45) Date of Patent: *Oct. 28, 2014

(54) SEQUENTIAL WRITES TO FLASH MEMORY

(71) Applicant: Marvell International Ltd., Hamilton (BM)

(72) Inventor: Abhjeet P. Gole, Cupertino, CA (US)

(73) Assignee: Marvell International Ltd., Hamilton (BM)

( * ) Notice: Subject to any disclaimer, the term of this patent is extended or adjusted under 35 U.S.C. 154(b) by 0 days.

This patent is subject to a terminal disclaimer.

(21) Appl. No.: 13/860,394

(22) Filed: Apr. 10, 2013

Related U.S. Application Data (63) Continuation of application No. 12/726,310, filed on Mar. 17, 2010, now Pat. No. 8,423,710.

(60) Provisional application No. 61/162,571, filed on Mar. 23, 2009, provisional application No. 61/169,035, filed on Apr. 14, 2009.

(51) Int. Cl.
 *G06F 12/00* (2006.01)
 *G06F 12/02* (2006.01)

(52) U.S. Cl.
 CPC .................................. *G06F 12/0246* (2013.01)
 USPC ............................ 711/103; 711/113; 711/154

(58) Field of Classification Search
 CPC . G06F 1/3203; G06F 12/0246; G06F 1/3253; G06F 13/385; G06F 13/4018; G06F 1/3228; G06F 1/324; G06F 1/3296; G06F 2213/3814; G06F 13/14; G06F 13/1647; G06F 13/1657; G06F 13/24; G06F 13/387; G06F 3/0659; G06F 3/0613; G06F 12/0866; G06F 3/0679; G06F 12/0804; G06F 3/061; G06F 3/065; G06F 3/067; G06F 11/2094; G06F 11/3433; G06F 11/3485; G06F 12/123; G06F 12/16; G06F 21/00; G06F 2212/214; G06K 7/10297; G06K 7/10861
 USPC .......................................... 711/103, 113, 154
 See application file for complete search history.

(56) References Cited

U.S. PATENT DOCUMENTS

| | | | |
|---|---|---|---|
| 4,611,299 | A | 9/1986 | Hori et al. |
| 4,823,340 | A | 4/1989 | Grassman et al. |
| 5,260,905 | A | 11/1993 | Mori |
| 5,307,343 | A | 4/1994 | Bostica et al. |
| 5,440,523 | A | 8/1995 | Joffe |

(Continued)

FOREIGN PATENT DOCUMENTS

| | | |
|---|---|---|
| FR | 2779843 | 12/1999 |
| JP | 1162294 | 6/1989 |

(Continued)

OTHER PUBLICATIONS

"Coprocessor", Retrieved from <http://en.wikipedia.org/wiki/Coprocessor>, Nov. 2006, 1 page.

(Continued)

*Primary Examiner* — Yong Choe (57) ABSTRACT

This disclosure describes techniques for improving flash memory write performance using sequential writes. In some cases this is accomplished using a write buffer to store random writes. The stored random writes are written to the flash memory when sufficient random writes are stored to perform a sequential write.

20 Claims, 4 Drawing Sheets

(56) References Cited

U.S. PATENT DOCUMENTS

| | | | |
|---|---|---|---|
| 5,680,595 A | 10/1997 | Thomann et al. |
| 5,701,517 A | 12/1997 | Carpenter |
| 5,719,890 A | 2/1998 | Thomman et al. |
| 5,778,007 A | 7/1998 | Thomann et al. |
| 5,802,131 A | 9/1998 | Morzano |
| 5,815,447 A | 9/1998 | Thomann |
| 5,864,504 A | 1/1999 | Tanzawa et al. |
| 5,875,470 A | 2/1999 | Dreibelbis et al. |
| 5,953,340 A | 9/1999 | Scott et al. |
| 5,996,051 A | 11/1999 | Mergard |
| 6,000,006 A | 12/1999 | Bruce et al. |
| 6,016,273 A | 1/2000 | Seki et al. |
| 6,021,086 A | 2/2000 | Joffe |
| 6,034,957 A | 3/2000 | Haddock et al. |
| 6,067,301 A | 5/2000 | Aatresh |
| 6,081,528 A | 6/2000 | Thomann |
| 6,115,389 A | 9/2000 | Mahale et al. |
| 6,160,814 A | 12/2000 | Ren et al. |
| 6,167,491 A | 12/2000 | McAlpine |
| 6,216,205 B1 | 4/2001 | Chin et al. |
| 6,230,191 B1 | 5/2001 | Walker |
| 6,370,624 B1 | 4/2002 | Ajanovic et al. |
| 6,446,173 B1 | 9/2002 | Pham |
| 6,487,207 B1 | 11/2002 | Thomann |
| 6,535,939 B1 | 3/2003 | Arimilli et al. |
| 6,535,963 B1 | 3/2003 | Rivers |
| 6,539,467 B1 | 3/2003 | Anderson et al. |
| 6,539,488 B1 | 3/2003 | Tota et al. |
| 6,567,304 B1 | 5/2003 | Kleveland |
| 6,615,324 B1 | 9/2003 | Fernald |
| 6,618,390 B1 | 9/2003 | Erimli et al. |
| 6,712,704 B2 | 3/2004 | Eliott |
| 6,714,643 B1 | 3/2004 | Gargeya et al. |
| 6,717,847 B2 | 4/2004 | Chen |
| 6,732,184 B1 | 5/2004 | Merchant et al. |
| 6,735,773 B1 | 5/2004 | Trinh et al. |
| 6,741,589 B1 | 5/2004 | Sang et al. |
| 6,785,272 B1 | 8/2004 | Sugihara |
| 6,876,702 B1 | 4/2005 | Hui et al. |
| 6,886,120 B2 | 4/2005 | Yamazaki |
| 7,038,950 B1 | 5/2006 | Hamilton et al. |
| 7,039,781 B2 | 5/2006 | Iwata et al. |
| 7,068,651 B2 | 6/2006 | Schmidt et al. |
| 7,075,827 B2 | 7/2006 | Aoyama et al. |
| 7,076,631 B2 | 7/2006 | Herron |
| 7,099,325 B1 | 8/2006 | Kaniz et al. |
| 7,130,308 B2 | 10/2006 | Haddock et al. |
| 7,136,953 B1 | 11/2006 | Bisson et al. |
| 7,149,834 B2 | 12/2006 | Peters et al. |
| 7,185,132 B2 | 2/2007 | Tang |
| 7,197,591 B2 | 3/2007 | Kwa et al. |
| 7,249,270 B2 | 7/2007 | Mansell et al. |
| 7,274,611 B2 | 9/2007 | Roohparvar |
| 7,284,106 B1 | 10/2007 | Fernald |
| 7,313,019 B2 | 12/2007 | Giduturi et al. |
| 7,329,136 B2 | 2/2008 | Su et al. |
| 7,334,072 B1 | 2/2008 | Wright |
| 7,356,676 B2 | 4/2008 | Paver et al. |
| 7,359,997 B2 | 4/2008 | Ishida et al. |
| 7,411,830 B2 | 8/2008 | Takeuchi et al. |
| 7,447,824 B2 | 11/2008 | Jabori et al. |
| 7,451,280 B2 | 11/2008 | Furtek et al. |
| 7,463,528 B2 | 12/2008 | Mokhlesi et al. |
| 7,467,253 B2 | 12/2008 | Yero |
| 7,469,311 B1 | 12/2008 | Tsu et al. |
| 7,478,188 B2 | 1/2009 | Patton |
| 7,480,757 B2 | 1/2009 | Atherton et al. |
| 7,480,808 B2 | 1/2009 | Caruk et al. |
| 7,496,707 B2 | 2/2009 | Freking et al. |
| 7,499,343 B2 | 3/2009 | Kang |
| 7,536,490 B2 | 5/2009 | Mao |
| 7,539,809 B2 | 5/2009 | Juenger |
| 7,542,350 B2 | 6/2009 | Park et al. |
| 7,571,287 B2 | 8/2009 | Lee et al. |
| 7,583,600 B1 | 9/2009 | Schanke et al. |
| 7,599,221 B2 | 10/2009 | Yamada |
| 7,606,960 B2 | 10/2009 | Munguia |
| 7,613,045 B2 | 11/2009 | Murin et al. |
| 7,613,871 B2 | 11/2009 | Tanaka et al. |
| 7,624,221 B1 | 11/2009 | Case |
| 7,649,539 B2 | 1/2010 | Evans et al. |
| 7,660,925 B2 | 2/2010 | Larson et al. |
| 7,685,322 B2 | 3/2010 | Bhesania et al. |
| 7,689,753 B2 | 3/2010 | Kwak et al. |
| 7,734,874 B2 | 6/2010 | Zhang et al. |
| 7,752,342 B2 | 7/2010 | Tee et al. |
| 7,822,955 B2 | 10/2010 | Flynn et al. |
| 7,903,462 B1 | 3/2011 | Yeung et al. |
| 7,941,590 B2 | 5/2011 | Yang et al. |
| 7,945,825 B2 | 5/2011 | Cohen et al. |
| 7,949,817 B1 | 5/2011 | Sakarda |
| 8,127,104 B1 | 2/2012 | Shen |
| 8,131,915 B1 | 3/2012 | Yang |
| 8,154,919 B2 | 4/2012 | Lee et al. |
| 8,205,028 B1 | 6/2012 | Sakarda |
| 8,213,228 B1 | 7/2012 | Yang |
| 8,213,236 B1 | 7/2012 | Wu |
| 8,234,425 B1 | 7/2012 | Milner |
| 8,335,878 B2 | 12/2012 | Lee |
| 8,423,710 B1 | 4/2013 | Gole |
| 8,533,386 B1 | 9/2013 | Yang |
| 8,688,922 B1 | 4/2014 | Assmann |
| 8,688,947 B1 | 4/2014 | Kona et al. |
| 8,756,394 B1 | 6/2014 | Warner |
| 2001/0003198 A1 | 6/2001 | Wu |
| 2001/0036116 A1 | 11/2001 | Kubo et al. |
| 2002/0116584 A1 | 8/2002 | Wilkerson |
| 2003/0154314 A1 | 8/2003 | Mason, Jr. et al. |
| 2004/0027901 A1 | 2/2004 | Shiga et al. |
| 2004/0093389 A1 | 5/2004 | Mohamed et al. |
| 2004/0098556 A1 | 5/2004 | Buxton et al. |
| 2004/0193774 A1 | 9/2004 | Iwata et al. |
| 2004/0199734 A1 | 10/2004 | Rajamani et al. |
| 2004/0202192 A9 | 10/2004 | Galbi et al. |
| 2005/0008011 A1 | 1/2005 | Georgiou et al. |
| 2005/0268001 A1 | 12/2005 | Kimelman et al. |
| 2006/0010304 A1 | 1/2006 | Homewood et al. |
| 2006/0031628 A1 | 2/2006 | Sharma |
| 2006/0075144 A1 | 4/2006 | Challener et al. |
| 2006/0106962 A1 | 5/2006 | Woodbridge et al. |
| 2006/0288153 A1 | 12/2006 | Tanaka et al. |
| 2006/0288188 A1 | 12/2006 | Ma et al. |
| 2007/0002880 A1 | 1/2007 | Chien et al. |
| 2007/0176939 A1 | 8/2007 | Sadowski |
| 2007/0229503 A1 | 10/2007 | Witzel et al. |
| 2007/0271609 A1 | 11/2007 | Chen et al. |
| 2007/0283086 A1* | 12/2007 | Bates .................... 711/113 |
| 2008/0094897 A1 | 4/2008 | Chung et al. |
| 2008/0126728 A1 | 5/2008 | Fernald |
| 2008/0147978 A1 | 6/2008 | Pesavento et al. |
| 2008/0148083 A1 | 6/2008 | Pesavento et al. |
| 2008/0175055 A1 | 7/2008 | Kim |
| 2008/0195801 A1 | 8/2008 | Cheon et al. |
| 2008/0215773 A1 | 9/2008 | Christison et al. |
| 2008/0215774 A1 | 9/2008 | Kim et al. |
| 2008/0256282 A1 | 10/2008 | Guo et al. |
| 2008/0265838 A1 | 10/2008 | Garg et al. |
| 2008/0270679 A1 | 10/2008 | Joo |
| 2008/0294951 A1 | 11/2008 | Ahmad et al. |
| 2008/0320189 A1 | 12/2008 | Arssov |
| 2009/0067511 A1 | 3/2009 | Wei et al. |
| 2009/0113166 A1 | 4/2009 | Houston et al. |
| 2009/0122610 A1 | 5/2009 | Danon et al. |
| 2009/0132770 A1 | 5/2009 | Lin |
| 2009/0150599 A1 | 6/2009 | Bennett |
| 2009/0154000 A1* | 6/2009 | Kojima .................... 360/71 |
| 2009/0200982 A1 | 8/2009 | Hurtz |
| 2009/0228739 A1 | 9/2009 | Cohen et al. |

(56) References Cited

U.S. PATENT DOCUMENTS

2009/0273975 A1 11/2009 Sarin et al.
2009/0300260 A1 12/2009 Woo et al.
2010/0027350 A1 2/2010 Melik-Martirosian et al.

FOREIGN PATENT DOCUMENTS

| JP | 4061094 | 2/1992 |
| JP | 5047174 | 2/1993 |
| JP | 10506776 | 6/1998 |
| JP | 2004288355 | 10/2004 |
| JP | 5107204 | 10/2012 |

OTHER PUBLICATIONS

"Final Office Action", U.S. Appl. No. 12/276,084, Oct. 17, 2011, 15 pages.
"Final Office Action", U.S. Appl. No. 12/332,870, Oct. 12, 2011, 17 pages.
"Non-Final Office Action", U.S. Appl. No. 12/726,310, Aug. 1, 2012, 11 pages.
"Non-Final Office Action", U.S. Appl. No. 12/276,084, Apr. 11, 2011, 12 pages.
"Non-Final Office Action", U.S. Appl. No. 12/332,870, Apr. 25, 2011, 15 pages.
"Non-Final Office Action", U.S. Appl. No. 12/332,870, May 8, 2013, 19 pages.
"Non-Final Office Action", U.S. Appl. No. 13/406,756, Nov. 5, 2012, 4 pages.
"Non-Final Office Action", U.S. Appl. No. 12/396,250, Jun. 23, 2011, 6 pages.
"Non-Final Office Action", U.S. Appl. No. 12/276,084, Mar. 29, 2013, 7 pages.
"Non-Final Office Action", U.S. Appl. No. 12/180,238, Apr. 12, 2011, 7 pages.
"Notice of Allowance", U.S. Appl. No. 12/396,250, Nov. 16, 2011, 4 pages.
"Notice of Allowance", U.S. Appl. No. 12/180,238, Oct. 25, 2011, 6 pages.
"Notice of Allowance", U.S. Appl. No. 12/726,310, Dec. 18, 2012, 6 pages.
"Notice of Allowance", U.S. Appl. No. 13/406,756, May 8, 2013, 7 pages.
"Restriction Requirement", U.S. Appl. No. 12/862,600, May 24, 2013, 7 pages.
"U.S. Appl. No. 12/726,310", filed Mar. 17, 2010, 36 pages.
"U.S. Appl. No. 12/862,600", filed Aug. 24, 2010, 36 pages.
"Link Street 88E6063 7-Port Fast Ethernet Switch with QoS, 802.1Q VLAN, and Virtual Cable Tester (VCT) Technology", Marvell: News; www.marvell.com; Marvell Semiconductor, Inc.; Sunnyvale, CA, Jul. 14, 2003, 1 page.
"Link Street 88E6181 8-Port Gigabit Ethernet Switch with Four-Level QoS", Marvell: News; www.marvell.com; Marvell Semiconductor, Inc.; Sunnyvale, CA, Jul. 14, 2003, 1 page.
"Non-Final Office Action", U.S. Appl. No. 10/702,744, Dec. 27, 2006, 10 pages.
"Non-Final Office Action", U.S. Appl. No. 12/163,801, Apr. 22, 2010, 10 pages.
"Notice of Allowance", U.S. Appl. No. 12/610,106, Feb. 29, 2012, 11 pages.
"Non-Final Office Action", U.S. Appl. No. 12/163,801, Jul. 20, 2011, 11 pages.
"Non-Final Office Action", U.S. Appl. No. 13/045,186, Aug. 22, 2013, 12 pages.
"Final Office Action", U.S. Appl. No. 12/163,801, Oct. 14, 2010, 12 pages.
"Final Office Action", U.S. Appl. No. 12/163,801, Nov. 14, 2011, 12 pages.
"Non-Final Office Action", U.S. Appl. No. 12/494,076, Dec. 22, 2010, 12 pages.
"Final Office Action", U.S. Appl. No. 12/494,076, Mar. 30, 2011, 13 pages.
"Non-Final Office Action", U.S. Appl. 12/182,014, Jun. 1, 2010, 13 pages.
"Final Office Action", U.S. Appl. No. 10/702,744, Jun. 25, 2007, 13 pages.
"Final Office Action", U.S. Appl. No. 12/494,076, Oct. 3, 2011, 13 pages.
"Notice of Allowance", U.S. Appl. No. 13/716,481, Nov. 14, 2013, 13 pages.
"Final Office Action", U.S. Appl. No. 12/434,000, Apr. 26, 2011, 15 pages.
"Non-Final Office Action", U.S. Appl. No. 12/434,000, May 4, 2012, 15 pages.
"Non-Final Office Action", U.S. Appl. No. 13/092,734, Aug. 24, 2011, 15 pages.
"Multiport Component Memory Series and Application with a Computer", Automated Translation; Europaisches Patentamt, European Patent Office, Office Europeen Des Brevets; Description of FR2779843; World Lingo Language Translation Services; www.worldlingo.com, Nov. 19, 2007, 15 pgs.
"Final Office Action", U.S. Appl. No. 12/182,014, Oct. 29, 2010, 16 pages.
"Final Office Action", U.S. Appl. No. 12/434,000, Sep. 4, 2012, 17 pages.
"Non-Final Office Action", U.S. Appl. No. 12/434,000, Mar. 14, 2013, 18 pages.
"Advisory Action", U.S. Appl. No. 12/163,801, Jan. 24, 2011, 2 pages.
"Corrected Notice of Allowance", U.S. Appl. No. 13/268,183, Nov. 19, 2013, 2 pages.
"Partial European Search Report", Application No. EP04006012; European Patent Office, Munich, Germany, Mar. 14, 2005, 2 pgs.
"Marvell Link Street Gigabit Ethernet Switches Enable the Rapid Deployment of Gigabit Connectivity for the SOHO Market", Marvell: Press and Investor News; Marvell Semiconductor, Inc.; Sunnyvale, CA; http://www.marvell.com/press/pressNewsDisplay.do?releaseID=347, Apr. 29, 2003, 2 pgs.
"6-Port Fast Ethernet Switch, 88E6060 (Product Overview)", Link Street; www.marvell.com; Marvell Semiconductor, Inc.; Sunnyvale, CA, 2002, 2 pgs.
"7-Port Fast Ethernet Switch with 802.1 Q, 88E6063 (Product Overview)", www.marvell.com; Marvell Semiconductor, Inc.; Sunnyvale, CA, 2002, 2 pgs.
"Link Street, Integrated Gateway Router with Multi-Port QoS Switch 88E6218 (Product Overview)", Gateway Solutions; www.marvell.com; Marvell Semiconductor, Inc.; Sunnyvale, CA, 2003, 2 pgs.
"Link Street, Integrated Gateway Router with Multi-Port Switch, 88E6208 (Product Overview)", Gateway Solutions; www.marvell.com; Marvell Semiconductor, Inc.; Sunnyvale, CA, 2003, 2 pgs.
"Final Office Action", U.S. Appl. No. 12/332,870, Sep. 10, 2013, 20 pages.
"Advisory Action", U.S. Appl. No. 10/702,744, 09/11/07, 3 pages.
"Foreign Office Action", Japanese Application No. 2004-071574, Feb. 19, 2008, 4 pages.
"European Search Report", Application No. EP04006012; Munich, Germany, May 30, 2005, 4 pages.
"Notice of Allowance", U.S. Appl. No. 13/092,734, Feb. 23, 2012, 4 pages.
"Notice of Allowance", U.S. Appl. No. 12/436,577, Apr. 14, 2011, 4 pages.
"Foreign Office Action", Japanese Application No. 2008-270813, May 26, 2011, 4 pages.
"Network Attached Storage (NAS) Advantages", Retrieved from: <http://www.html.co.uk/86/network-attached-storage-nas-advantages.htm l> on Oct. 7, 2013, Aug. 22, 2008, 4 pages.
"European Communication and Search Report", Application No. EP04006012; European Patent Office; Munich, Germany, May 30, 2005, 4 pgs.
"Non-Final Office Action", U.S. Appl. No. 10/702,744, Feb. 19, 2009, 5 pages.
"Restriction Requirement", U.S. Appl. No. 13/045,186, Jun. 19, 2013, 5 pages.

(56) References Cited

OTHER PUBLICATIONS

"Restriction Requirement", U.S. Appl. No. 10/702,744, Jun. 30, 2006, 5 pages.
"Method and Circuit for Transferring Data with Dynamic Parity Generation and Checking Scheme in Multi-port DRAM", esp@cenet; Publication No. JP10506776T (Abstract of Corresponding Document No. US5778007); esp@cenet Database—Worldwide; http://v3.espacenet.com/textdoc?DB=EPODOC &IDX=JP10506776T&F=0, Jun. 30, 1998, 5 pages.
"Notice of Allowance", U.S. Appl. No. 13/268,183, Jul. 29, 2013, 5 pages.
"Notice of Allowance", U.S. Appl. No. 12/276,084, Oct. 29, 2013, 5 pages.
"Notice of Allowance", U.S. Appl. No. 13/177,965, Nov. 20, 2013, 5 pages.
"Restriction Requirement", U.S. Appl. No. 12/610,106, Dec. 7, 2011, 5 pages.
"Non-Final Office Action", U.S. Appl. No. 13/538,827, May 2, 2013, 6 pages.
"Notice of Allowance", U.S. Appl. No. 12/182,014, Jan. 20, 2011, 6 pages.
"Final Office Action", U.S. Appl. No. 13/092,734, Dec. 29, 2011, 6 pages.
"Notice of Allowance", U.S. Appl. No. 12/762,150, Mar. 19, 2012, 6 pages.
"Notice of Allowance", U.S. Appl. No. 12/163,801, Mar. 22, 2012, 6 pages.
"Foreign Office Action", Japanese Application No. 2008-270813, Apr. 3, 2012, 6 pages.
"Non-Final Office Action", U.S. Appl. No. 13/268,183, May 7, 2013, 6 pages.
"Non-Final Office Action", U.S. Appl. No. 12/436,577, Sep. 29, 2010, 6 pages.
"Non-Final Office Action", U.S. Appl. No. 13/538,827, Feb. 22, 2013, 7 pages.
"Notice of Allowance", U.S. Appl. No. 10/702,744, 03/27/09, 7 pages.
"Non-Final Office Action", U.S. Appl. No. 13/177,965, Jul. 2, 2013, 7 pages.
"Foreign Notice of Allowance", Japanese Application No. 2008-270813, Aug. 31, 2012, 7 pages.
"Notice of Allowance", U.S. Appl. No. 13/538,827, Sep. 17, 2013, 7 pages.
"Non-Final Office Action", U.S. Appl. No. 12/862,600, Oct. 16, 2013, 8 pages.
"Notice of Allowance", U.S. Appl. No. 12/494,076, Aug. 2, 2012, 8 pages.
"Notice of Allowance", U.S. Appl. No. 12/434,000, Oct. 17, 2013, 9 pages.
"Notice of Allowance", U.S. Appl. No. 13/045,186, Nov. 1, 2013, 9 pages.
"Non-Final Office Action", U.S. Appl. No. 12/434,000, Nov. 10, 2010, 9 pages.
"Information Technology—Telecommunications and Information Exchange Between Systems—Local and Metropolitan Area Networks—Specific Requirements", IEEE, Wireless LAN Medium Access Control (MAC) and Physical Layer (PHY) Specifications, Aug. 20, 1999, 531 pages.
Litaize, et al., "Serial Multi Port Memory Component Comprising RAM Memory Bank Assemblies for Use in Computer", Abstract of FR2779843; Publication No. FR2779843; esp@cenet database; http://v3.espace.com/textdoc?DB=EPODOC&IDX=FR2779843 &F=0, Dec. 12, 1999, 1 page.
Mori, "Multiport Memory", English Abstract of Japanese Patent Publication No. JP5047174; esp@cenet database—Worldwide, Feb. 26, 1993, 1 page.
Pallampati, "iSCSI Performance Over RDMA-Enabled Network", Thesis, Department of Electrical and Computer Engineering, Graduate School of Wichita State University, Jul. 2006, 58 pages.
Prince, "High Performance Memories, New Architectures DRAMs and SRAMs—Evolution and Function", John Wiley & Sons, Ltd.; West Sussex, England, 1996, pp. 58-61.
"Non-Final Office Action", U.S. Appl. No. 12/332,870, Feb. 7, 2014, 19 pages.
"Non-Final Office Action", U.S. Appl. No. 14/199,307, Apr. 10, 2014, 5 pages.
"Final Office Action", U.S. Appl. No. 12/332,870, Jun. 26, 2014, 20 pages.
"Notice of Allowance", U.S. Appl. No. 14/199,307, May 7, 2014, 7 pages.

\* cited by examiner

SEQUENTIAL WRITES TO FLASH MEMORY

RELATED APPLICATION

This present disclosure is a continuation of U.S. patent application Ser. No. 12/726,310, filed Mar. 17, 2010, which claims priority under 35 U.S.C. §119(e) to U.S. Provisional Patent Application Ser. No. 61/162,571 filed Mar. 23, 2009 and U.S. Provisional Patent Application Ser. No. 61/169,035 filed Apr. 14, 2009, the disclosure of which are incorporated by reference herein in their entirety.

BACKGROUND

Unless otherwise indicated herein, the approaches described in this section are not prior art to the claims in this application and are not admitted to be prior art by inclusion in this section.

In conventional NAND flash memory, flash cells are organized into pages and pages are organized into blocks. Conventional NAND flash memory has some design limitations, such as having to write an entire page of cells to write a single flash cell. Further, if any of the flash cells in the page have previously been written, those flash cells have to be erased prior to writing. To erase those flash cells the entire block of pages containing those flash cells also has to be erased.

In part to address these design limitations, writing to flash cells of NAND flash memory often involves copying data from every page of cells within a block to a buffer, erasing the entire block, modifying the data associated with the flash cells in the buffer, and writing every page of cells within the block. This does not permit good data throughput in many situations, especially those using random writes. A random write is a write of data to any randomly chosen location within the flash memory and often involves no more than a few bytes of data.

SUMMARY

This summary is provided to introduce subject matter that is further described below in the Detailed Description and Drawings. Accordingly, this Summary should not be considered to describe essential features nor used to limit the scope of the claimed subject matter.

In one embodiment, a method is described that comprises storing first data associated with a first write request in a write buffer that is separate from a flash memory, the first write request being configured to request that at least part of the first data be written to the flash memory, determining that the first data and second data associated with a second write request are sufficient for a sequential write to be performed to the flash memory, and performing a sequential write of the first data and the second data to the flash memory.

In another embodiment, a method is described that comprises receiving a request to write first data to a flash memory, determining that the first data is not sufficient to be written through a sequential write, storing the first data in a write buffer that is separate from the flash memory until sufficient second data associated with one or more additional write requests is stored in the write buffer such that the sequential write is capable of being performed using the first and the second data, and performing the sequential write of the first and the second data to the flash memory in response to determining that the first and the second data are sufficient to perform the sequential write.

In still another embodiment, a system is described that comprises a flash-memory controller, a write buffer separate from a flash memory, and a write-buffer controller configured to cause the flash-memory controller to store first data associated with a first write request in the write buffer, the first write request configured to request that at least part of the first data be written to the flash memory, determine that the first data and second data associated with a second write request are sufficient for a sequential write to be performed to the flash memory, and perform a sequential write of the first data and the second data to the flash memory.

BRIEF DESCRIPTION OF THE DRAWINGS

The detailed description is described with reference to the accompanying figures. In the figures, the left-most digit of a reference number identifies the figure in which the reference number first appears. The use of the same reference numbers in different instances in the description and the figures indicate similar or identical items.

DETAILED DESCRIPTION

This disclosure describes apparatuses and techniques for making sequential writes to flash memory. In some cases this is accomplished using a write buffer to store random writes. The stored random writes are written to the flash memory when sufficient random writes are stored to perform a sequential write. Sequential writes are faster than random writes from a data throughput perspective. These techniques effectively increase the data throughput of flash memory by grouping multiple random writes into one sequential write.

In the discussion that follows, an operating environment is described. Methods are also described that may be employed in the operating environment as well as other environments. In the discussion below, reference will be made to the environment by way of example only and, therefore, implementations described below are not limited to the environment.

Operating Environment

Figure 1:
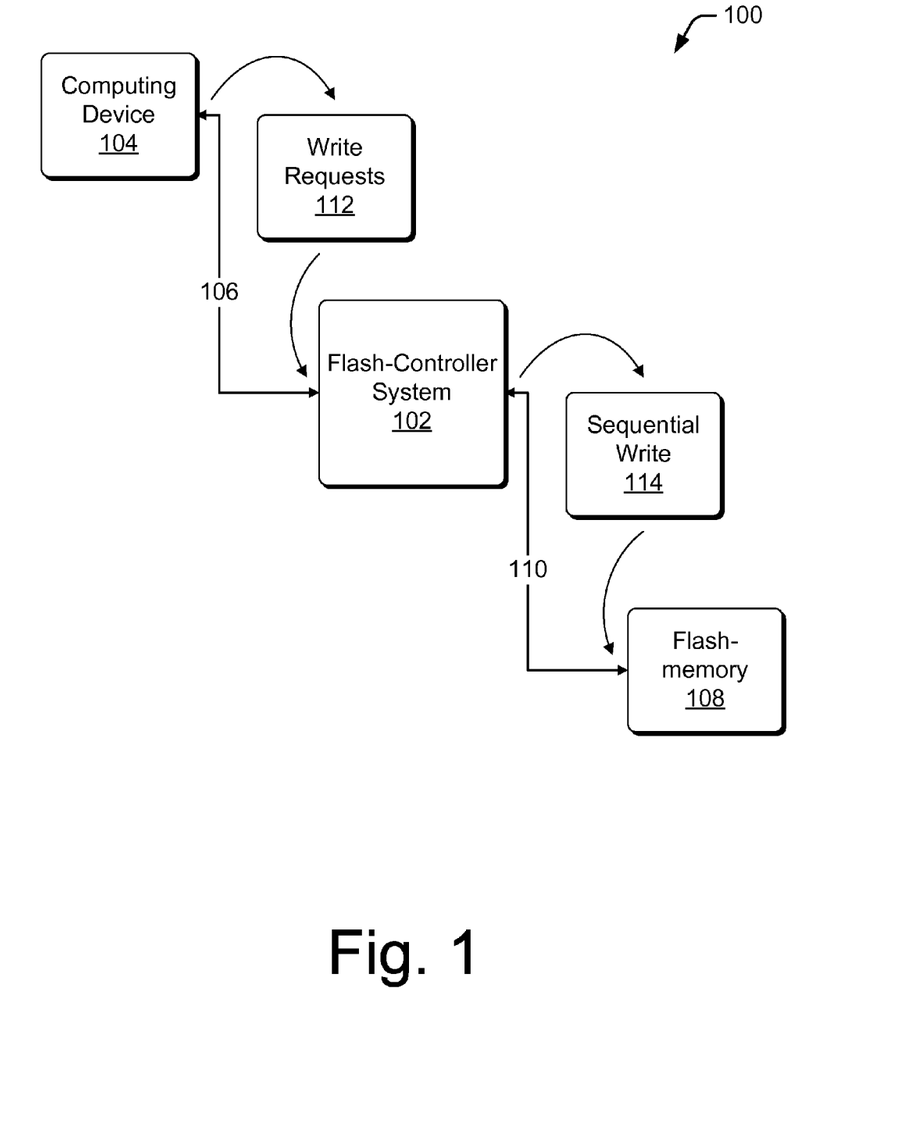
FIG. 1 illustrates an operating environment in accordance with one or more embodiments.

FIG. 1 illustrates an operating environment 100 having a flash-controller system 102. Flash-controller system 102 is communicatively linked with computing device 104 through communication link 106 and with a flash memory 108 through communication link 110. Link 106 and link 110 is each a wired communication link and/or a wireless communication link. Flash memory 108 may include multiple blocks of flash memory, such as NAND flash memory, and may be located within flash-controller system 102.

Flash-controller system 102 receives write requests 112 from computing device 104. Each write request 112 describes data to be written to flash memory 108. After multiple write requests 112 have been received, flash-controller system 102 performs a sequential write 114 having data from these write requests 112. Sequential write 114 may be a partial or complete sequential write. A partial sequential write includes data that fills at least two bytes worth of cells in a block (but less than all of the cells in a block) of flash memory 108. A complete sequential write includes data that fills all of the cells in a block of flash memory 108.

Figure 2:
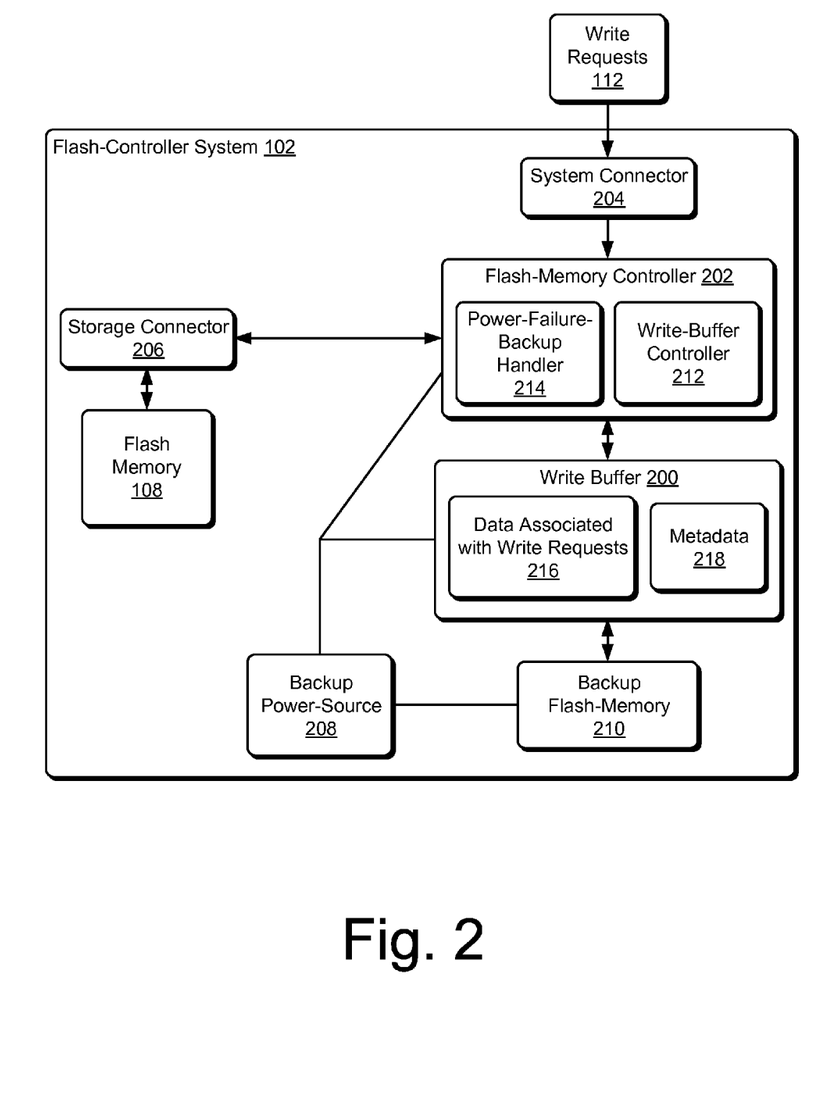
FIG. 2 illustrates a flash-controller system in accordance with one or more embodiments.

FIG. 2 illustrates an example of a detailed embodiment of flash-controller system 102. Flash-controller system 102 includes a write buffer 200 to which flash-controller system 102 stores write requests 112. After sufficient write requests 112 have been stored to enable sequential write 114, flash-controller system 102 communicates sequential write 114 to flash memory 108 over communication link 110.

Flash-controller system 102 also includes flash-memory controller 202, system connector 204, storage connector(s) 206, backup power-source 208, backup flash-memory 210, and, in this embodiment, flash memory 108. Flash-memory controller 202 includes write-buffer controller 212 and power-failure-backup handler 214. Write buffer 200 is a computer-readable-medium such as dynamic random access memory (DRAM) with a capacity that is a substantial percentage of the total space of flash memory 108, such as twenty-five percent. Write-buffer controller 212 stores write requests 112 and data associated with the write requests 216 in write buffer 200. This data associated with the write requests 216 is the data for which writing is being requested with the write requests 112.

Write-buffer controller 212 also stores metadata 218 in write buffer 200. Metadata 218 includes information about data 216. Metadata 218 can be used to track or organize data 216 using a data structure, such as a radix-tree data structure. Metadata 218 is updated to keep track of blocks of data in flash memory 108 that have been updated by write requests but which have not yet been written to flash memory 108. When computing device 104 requests to read data, metadata 218 is checked to see if the latest version (a most recently modified version) of the data is in write buffer 200. If the data is in a block that is in data 216, then the latest version of the data is in write buffer 200 (otherwise, the latest version of the data is not in write buffer 200). If the latest version of the data is in write buffer 200, the data is read from write buffer 200 instead of from flash memory 108. After data 216 is written to flash memory 108, metadata 218 is updated to remove entries regarding the written data.

Metadata 218 may also include another radix-tree type of data structure to arrange multiple write requests 112 into one sequential write 114. Write-buffer controller 212 uses metadata 218 to translate logical-block-addressing (LBA) to physical-block-addressing (PBA) and write changed blocks to flash memory 108 in a log-structured manner. The same radix-tree data structure can be used for this address translation to track data changes. By using the radix-tree to write back the data in a log-structured manner, wear leveling and associated garbage collection can be handled in write buffer 200, which is faster and allows flash memory 108 to be available for writing data. Furthermore, flash memory 108 may forgo space reserved for wear leveling and garbage collection.

Power-failure-backup handler 214 detects when power to flash-controller system 102 is lost, and in response to detecting that power is lost backs up data 216 and metadata 218 to backup flash-memory 210. Backup power-source 208 keeps flash-memory controller 202, backup flash-memory 210, and write buffer 200 powered while handler 214 performs a backup of data 216 and metadata 216. Backup power-source 208 is an auxiliary battery or a temporary power-source, such as super capacitors. Super capacitors, also known as electric double-layer capacitors, are electrochemical capacitors that have an unusually high energy density compared to that of common capacitors and usually operate at a lower working voltage. Backup flash-memory 210 is an area of flash memory reserved for backup of write buffer 200. This reserved area of flash memory is located within flash memory 108 or in a separate flash memory mounted on or external to flash-controller system 102. Power-failure-backup handler 214 also detects when power to flash-controller system 102 is subsequently restored, and in response to detecting that power has been restored restores data 216 and metadata 218 to write buffer 200.

System connector 204 connects to communication link 106 (e.g., is a Peripheral Component Interconnect Express "PCIe" connector). Storage connector 206 connects to communication link 110.

Note that one or more of the entities shown in FIGS. 1 and/or 2 may be further divided, combined, and so on. Each of these entities can be hardware, software, firmware, or a combination thereof, and/or stored on computer-readable-media and executed by one or more processors (not shown). For example, write-buffer controller 212 and power-failure-backup handler 214 can be software and/or firmware executed by flash-memory controller 202 or as driver software executed by computing device 104.

Also note that flash-controller system 102 can be implemented in different manners. Flash-controller system 102 can be a circuit board including various integrated circuits (ICs), a system-on-chip (SoC), or a device including multiple circuit boards. Furthermore, flash memory 108 can be included within flash-controller system 102 or as part of a separate flash-memory device. Flash-controller system 102 can be included as part of various different devices, such as part of a computing device, a portable flash-memory device, a video processing and/or rendering device, a television set-top box, or a gaming device.

Techniques for Sequential Writes

This disclosure describes techniques for improving flash memory write performance, such as by storing multiple writes into a sequential write. Two methods are illustrated below, aspects of which may be implemented in hardware, firmware, software, or a combination thereof. These methods are shown as a set of acts that specify operations performed by one or more entities and are not necessarily limited to the order shown.

Figure 3:
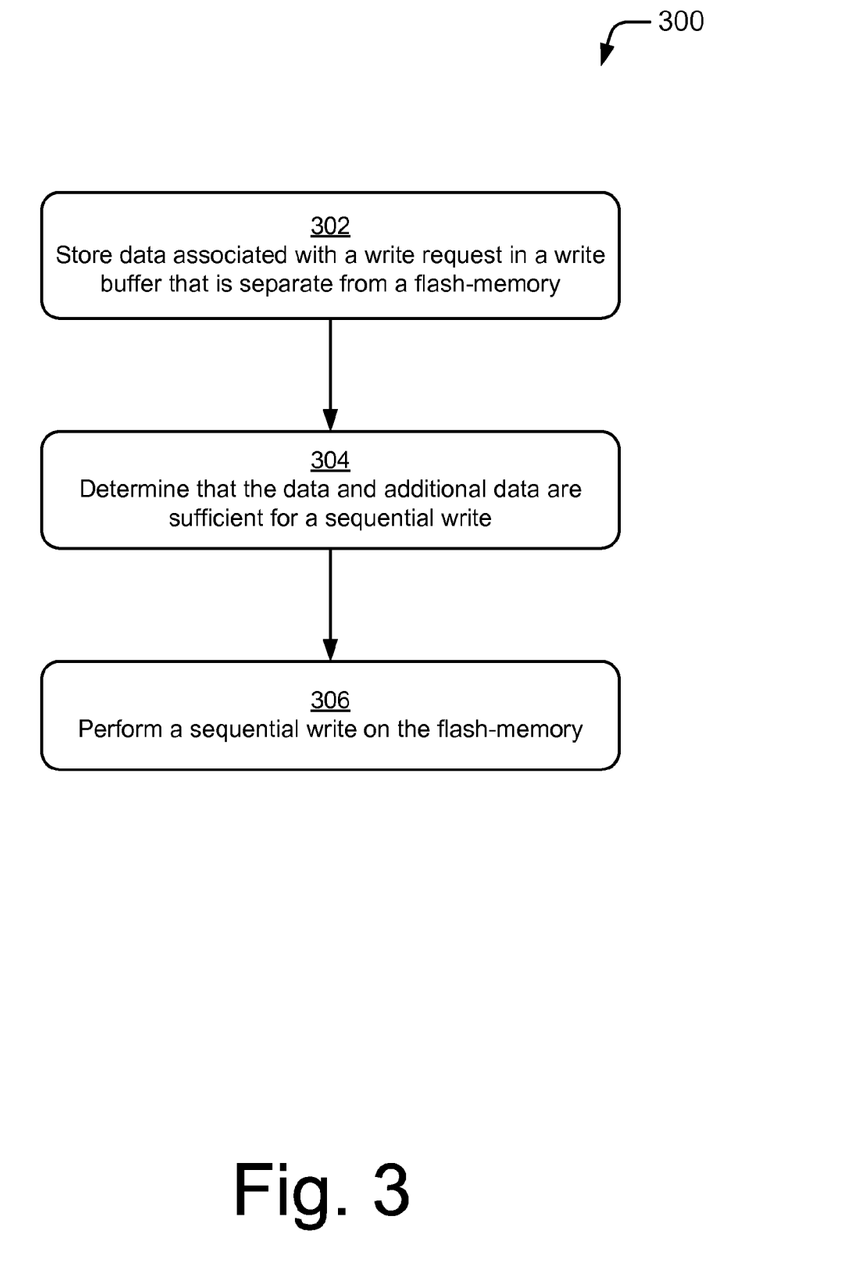
FIG. 3 illustrates a method for improving flash-memory write performance by storing write requests in accordance with one or more embodiments.

FIG. 3 illustrates a method 300 for improving flash-memory write performance. At 302, data associated with a write request is stored in a write buffer that is separate from a flash memory. Consider method 300 in the context of FIGS. 1 and 2. At 302, write-buffer controller 212 stores data 216 in write buffer 200. Write buffer 200 also contains additional data from other write requests, such as from prior iterations of operation 302.

At 304, the data and additional data associated with one or more additional write requests are determined to be sufficient for a sequential write to be performed on the flash memory. Continuing the ongoing example, at 304, write-buffer controller 212 determines, using metadata 218, that enough data 216 has been stored to enable a sequential write 114 to be performed on flash memory 108. Data associated with two writes that affect cells in a same block but not all cells in the block is sufficient to perform a partial sequential write, which enables better performance than performing the writes separately. Data associated with two or more writes that affect all cells in a block is sufficient to perform a complete sequential write.

At 306, a sequential write of the first data and the second data is performed on the flash memory. At 306, write-buffer controller 212 performs a sequential write 114 of at least a portion of data 216 to flash memory 108. This portion of data 216 is then removed from write buffer 200 and metadata 218 is updated. The sequential write may be a partial or complete sequential write.

In some embodiments, the sequential write at 306 is performed in response to there being sufficient data for a sequential write (for a partial sequential or for a complete sequential write). In other embodiments, the sequential write at 306 is performed more or less often and based on other factors. For example, write-buffer controller 212 may be configured to determine when write buffer 200 is full or nearly full (e.g., in danger of becoming full such as by at least a threshold amount of buffer 200 being filled). In response to this determination write-buffer controller 212 performs a sequential write. A block of data in flash memory 108 may have pending write requests 112 stored within write buffer 200, for instance. While these pending write requests do not contain enough data to fill an entire block of cells (a complete sequential write), it is still more efficient to write them sequentially than separately. Write buffer controller 212 combines these write requests 112 into a partial sequential write request. This partial sequential write writes to a block of cells but does not contain data sufficient to write to every cell in the block. The corresponding area of write buffer 200 is freed up for further use. If no combination of write requests is found, a single write request may be performed.

Write-buffer controller 212 may use metadata 218 to select which portions of data 216 to be written through partial sequential writes. For example, a block of data in flash memory 108 having more pending write requests 112 stored within write buffer 200 is selected for a partial sequential write before a block of data in flash memory 108 having fewer pending write requests 112 stored within write buffer 200 is selected for a partial sequential write.

Further, write buffer controller 212 is configured, in some embodiments, to monitor the rate at which data is incoming via write requests 112. If the incoming data rate is low, write buffer controller 212 performs complete or partial sequential writes or single writes because they do not impact (or impact very little) overall data throughput. During this period of low incoming data rate, write buffer controller 212 may also pre-erase blocks of data in flash memory 108 for later use.

By storing random-write requests in write buffer 200, flash-memory controller 202 becomes immediately available to handle the next incoming write requests. This allows the incoming write requests to continue at a higher rate than if flash-memory controller 202 waits for each write request to be performed prior to handling the next request. This in turn improves overall data throughput.

Furthermore, conventional NAND flash memory employs wear leveling techniques that shift data being written to blocks with lower cycle counts (the number of times the block of cells has been written). For random writes this wear-leveling leaves behind invalid data that is later cleaned up through a process known as garbage collection. Garbage collection copies valid data from a block and then erases the block freeing it for later use. If the NAND flash memory is performing garbage collection it is not immediately available for responding to write requests. This results in additional write performance degradation. Wear leveling also oftentimes requires a particular amount (e.g., approximately twenty-five percent) of the storage space of the flash memory to be reserved for garbage collection purposes.

In some embodiments, write buffer controller 212 is configured to translate logical-block-addressing (LBA) to physical-block-addressing (PBA) and write changed blocks to flash memory 108 in a log-structured manner. This allows write buffer controller 212 to maintain a record of how often blocks have been written (explicitly or relative to other bocks in flash memory 108). By writing back the data in a log-structured manner, wear leveling and associated garbage collection can be handled in write buffer 200, which is both faster and allows flash memory 108 to be available for writing data. For example, based on this record, write buffer controller 212 can determine which blocks of flash memory 108 to write to and/or for which blocks of flash memory 108 garbage collection is to be performed. Furthermore, flash memory 108 may forgo space reserved for wear leveling and garbage collection so that a particular amount of the storage space of the flash memory need not be reserved for garbage collection purposes.

Figure 4:
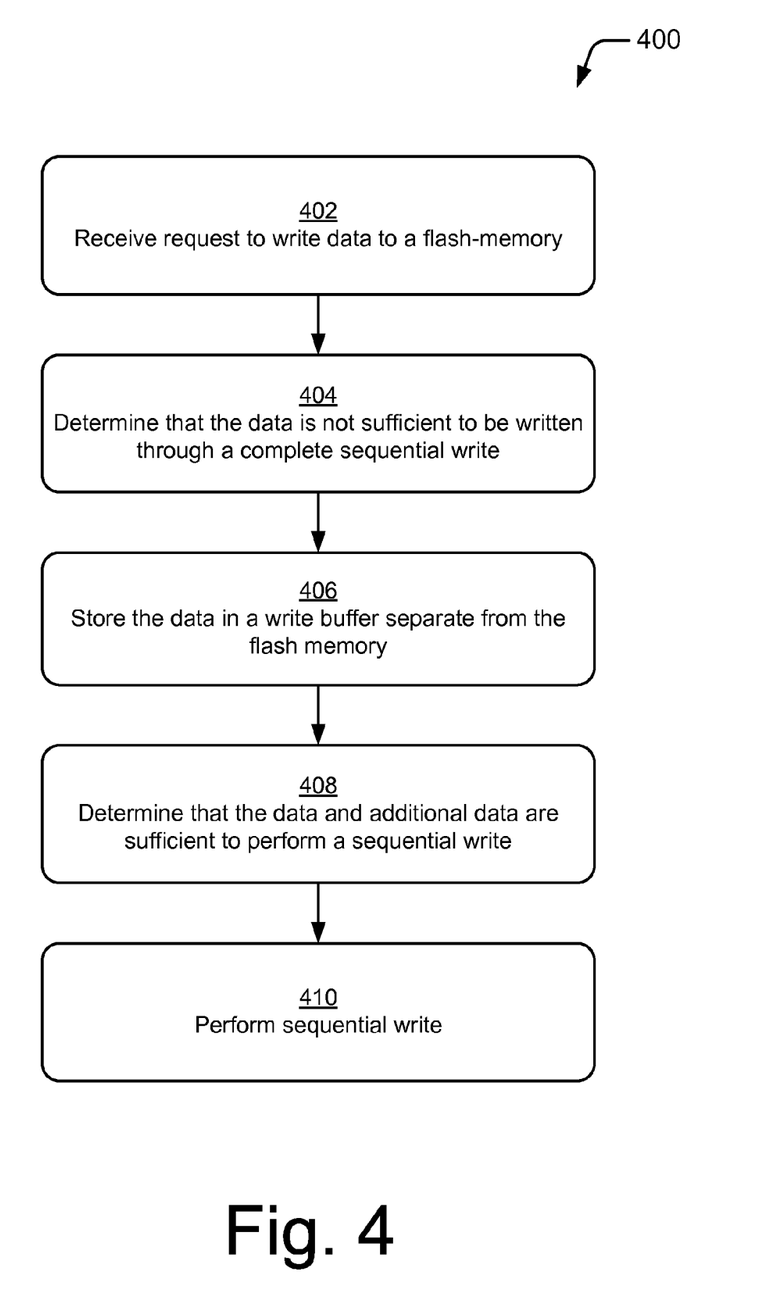
FIG. 4 illustrates a method for improving flash-memory write performance by determining that a write request is not sufficient for a complete sequential write in accordance with one or more embodiments.

FIG. 4 illustrates an example of a method 400 for improving flash-memory write performance. At 402, a request to write data to a flash memory is received. In the context of FIGS. 1 and 2, write-buffer controller 212 receives a write request 112 to write data to flash memory 108.

At 404, it is determined that the data is not sufficient to be written through a complete sequential write, such as by write-buffer controller 212. The data requested to be written may not be sufficient to fill an entire block of cells in flash memory 108.

At 406, the data is stored in a write buffer that is separate from the flash memory. The data is stored until sufficient additional data associated with one or more other write requests is stored in the write buffer such that a sequential write is capable of being performed using the data received at 402 and the additional data associated with one or more other write requests. For example, at 406, write-buffer controller 212 stores the data in write buffer 200 as part of data 216. Metadata 218 is updated to account for this change to data 216.

At 408, it is determined that the data received at 402 and the additional data associated with one or more other write requests are sufficient to perform a sequential write. This may be performed in various manners as described above. Continuing the ongoing example, write-buffer controller 212 determines that the data received at 402 and the additional data associated with one or more other write requests is stored in write buffer 200.

At 410, a sequential write of the data and additional data is performed on the flash memory. The sequential write is performed in response to determining that sufficient data and additional data are stored in the write buffer such that a sequential write is capable of being performed. For example, at 410, once enough data 216 is stored sufficient to fill a new block of cells or to modify an existing block of cells, write-buffer controller 212 performs sequential write 114 on flash memory 108. The sequential write may be partial or complete.

In some embodiments, method 400 uses a partial sequential write rather than a complete sequential write. Operation 404, in this case, may determine that the data is not sufficient to be written until some threshold percentage of an entire block of cells has been written to. This percentage can be modified depending on throughput requirements or a current rate of incoming write requests. If a current rate of incoming write requests goes up, the percentage increases. If the current rate goes down, the percentage decreases.

One or more of the techniques described above can be performed by one or more programmable processors executing a computer program to perform functions by operating on input data and generating output. Generally, the techniques can take the form of an entirely hardware embodiment, an entirely software embodiment, or an embodiment containing both hardware and software components. In one implementation, the methods are implemented in software, which includes but is not limited to firmware, resident software, microcode, etc. Furthermore, the methods can take the form of a computer program product accessible from a computer-usable or computer-readable medium providing program code for use by or in connection with a computer or any instruction execution system.

For the purposes of this description, a computer-usable or computer-readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

Although the subject matter has been described in language specific to structural features and/or methodological techniques and/or acts, it is to be understood that the subject matter defined in the appended claims is not necessarily limited to the specific features, techniques, or acts described above, including orders in which they are performed.

What is claimed is:

1. A method comprising:
performing a first sequential write of first data associated with a sequential-write request directly to a flash memory;
storing second data associated with a first random-write request to a volatile memory that is separate from the flash memory, the first random-write request requesting that at least part of the second data be written to the flash memory;
determining that the second data and third data, the third data associated with a second random-write request, are sufficient for a second sequential write to be performed to the flash memory; and
performing the second sequential write of the first data and the second data to the flash memory.

2. The method as recited in claim 1, wherein the second sequential write is a complete sequential write that includes data for every cell within a block of the flash memory.

3. The method as recited in claim 1, wherein the second write request is another random write request to the flash memory, and the second sequential write is a partial sequential write to the flash memory that includes data for two or more bytes worth of cells within a block of the flash memory.

4. The method as recited in claim 1, wherein performing the second sequential write is in response to determining that the volatile memory is full.

5. The method as recited in claim 1, wherein performing the second sequential write is in response to determining that a rate of incoming random-write requests is below a threshold amount.

6. The method as recited in claim 1, wherein the volatile memory comprises dynamic random-access memory (DRAM) configured as a cache memory for data associated with the random-write requests.

7. The method as recited in claim 1, further comprising:
responsive to detecting that a power failure has occurred, copying the first data from the volatile memory to an area of back-up memory, the back-up memory configured to maintain data without power; and
responsive to detecting that power has been restored, copying the first data from the back-up memory to the volatile memory.

8. The method as recited in claim 7, wherein the flash memory is a first flash memory and the back-up memory is a second flash memory that is separate from the first flash memory.

9. A method comprising:
performing a first sequential write of first data associated with a sequential-write request directly to a flash memory;
receiving a random-write request to write second data to the flash memory;
determining that the second data is not sufficient to perform a second sequential write to one or more blocks of the flash memory;
storing the second data associated with the random-write request in a volatile memory that is separate from the flash memory until sufficient third data associated with one or more additional random-write requests is stored in the volatile memory such that the second sequential write to one or more blocks of the flash memory is capable of being performed using the second data and the third data; and
performing the second sequential write of the second data and the third data to the one or more blocks of the flash memory in response to determining that the second data and third data are sufficient to perform the second sequential write.

10. The method as recited in claim 9, further comprising:
receiving a request to read data from the flash memory;
determining that the data is within the volatile memory; and
communicating the data from the volatile memory to satisfy the request to read the data.

11. The method as recited in claim 9, further comprising:
performing, via a volatile memory controller that is separate from the flash memory, flash-memory wear leveling; and
pre-erasing the one or more blocks of the flash memory prior to performing the second sequential write to the one or more blocks of the flash memory.

12. A system comprising:
an interface configured to receive data from a host device;
flash memory configured to store the data received from the host device;
a volatile memory configured to store data associated with random-write requests of the host device, the volatile memory separate from the flash memory; and
a memory controller configured to:
perform a sequential write of first data associated with a sequential-write request directly to a block of the flash memory;
store second data associated with a first random-write request in the volatile memory, the first random-write request configured to request that at least part of the second data be written to the flash memory;
determine that the second data and third data, the third data associated with a second random-write request, are sufficient to perform another sequential write that will fill a block of the flash memory; and
perform another sequential write of the second data and third data to another block of the flash memory.

13. The system as recited in claim 12, wherein the interface is a Peripheral Component Interconnect Express (PCIe) communication link and the first random-write request and the second data are received from the host device via the PCIe communication link.

14. The system as recited in claim 12, further comprising a processor and wherein the memory controller is implemented by executing processor-executable instructions via the processor of the system.

15. The system as recited in claim 12, wherein the flash memory is configured as a flash-based solid-state drive (SSD) and the system is embodied as an SSD controller.

16. The system as recited in claim 12, wherein the memory controller is further configured to:
   detect that a power failure has occurred, and responsive to detecting that the power failure occurred, copy the second data from the volatile memory to an area of back-up memory, the back-up memory configured to maintain data without power; and
   detect that power has been restored, and responsive to detecting that the power has been restored, copy the second data from the back-up memory to the volatile memory.

17. The system as recited in claim 16, wherein the flash memory is a first flash memory and the back-up memory is a second flash memory that is separate from the first flash memory.

18. The system as recited in claim 12, wherein the flash memory is separate from the system and the system further comprises a communication link to the flash memory.

19. The system as recited in claim 12, wherein the volatile memory comprises dynamic random-access-memory (DRAM) configured as a cache memory for storing data associated with random-write requests.

20. The system as recited in claim 12, wherein the system is implemented as a system-on-chip.

* * * * *